(12) United States Patent
Hawes et al.

(10) Patent No.: US 7,523,679 B2
(45) Date of Patent: Apr. 28, 2009

(54) SWITCH-BASED SEAT SENSOR FOR OCCUPANT PRESENCE DETECTION

(75) Inventors: Kevin J. Hawes, Greentown, IN (US); Morgan D. Murphy, Kokomo, IN (US); Walter K. Kosiak, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 62 days.

(21) Appl. No.: 11/801,980

(22) Filed: May 11, 2007

(65) Prior Publication Data

US 2008/0203712 A1    Aug. 28, 2008

Related U.S. Application Data

(60) Provisional application No. 60/903,192, filed on Feb. 23, 2007.

(51) Int. Cl.
*G01L 1/00* (2006.01)
*B60R 21/33* (2006.01)

(52) U.S. Cl. .................. 73/862.381; 200/5 A; 280/735

(58) Field of Classification Search ...............
73/862.391–862.382, 780; 200/5 A, 5 R; 280/730.1–735
See application file for complete search history.

(56) References Cited

U.S. PATENT DOCUMENTS

| | | | | |
|---|---|---|---|---|
| 3,845,261 A | * | 10/1974 | Blinkilde | 200/85 A |
| 4,490,587 A | * | 12/1984 | Miller et al. | 200/5 A |
| 4,716,262 A | * | 12/1987 | Morse | 200/5 A |
| 5,091,613 A | * | 2/1992 | Rohde et al. | 200/86.5 |
| 5,298,705 A | * | 3/1994 | Sachs | 200/513 |
| 5,536,911 A | * | 7/1996 | Madill | 200/6 A |
| 5,856,641 A | * | 1/1999 | Schreiber et al. | 200/1 B |
| 6,367,837 B1 | * | 4/2002 | Hamada et al. | 280/735 |
| 6,918,612 B2 | * | 7/2005 | Smith et al. | 280/735 |
| 7,268,305 B2 | * | 9/2007 | Schmidt et al. | 200/5 R |
| 2005/0057350 A1 | * | 3/2005 | Younse | 340/457.1 |

FOREIGN PATENT DOCUMENTS

| JP | 09058999 A | * | 3/1997 |
|---|---|---|---|
| JP | 2002052967 A | * | 2/2002 |

OTHER PUBLICATIONS

U.S. Appl. No. 11/706,016, filed Feb. 14, 2007, Hawes et al.

* cited by examiner

*Primary Examiner*—Harshad Patel
*Assistant Examiner*—Punam Patel
(74) *Attorney, Agent, or Firm*—Douglas D. Feket

(57) ABSTRACT

A switch-based sensor apparatus is disposed between the bottom cushion and frame of a seat. The sensor apparatus includes upper and lower rigid and generally parallel force translation plates biased apart by a set of springs, and a switch assembly. The force translation plates are joined so as to pre-load the springs while permitting closing movement between the upper and lower force translation plates in response to occupant seat force that exceeds the pre-load force of the springs. The switch assembly includes a circuit board and elastomeric switch pad defining one or more switch elements that are actuated by a prescribed closing movement between the upper and lower force translation plates for electrically detecting the presence of a seat occupant.

8 Claims, 7 Drawing Sheets

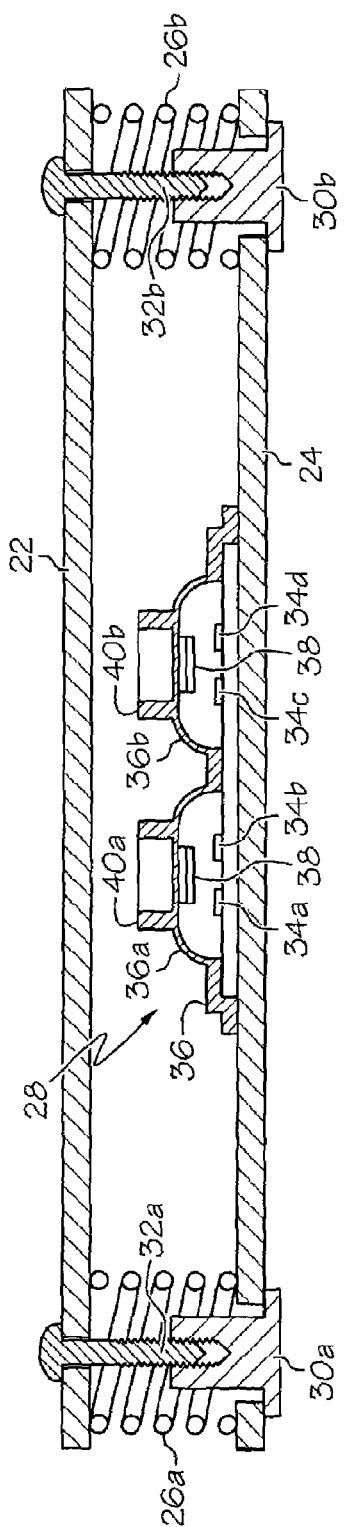
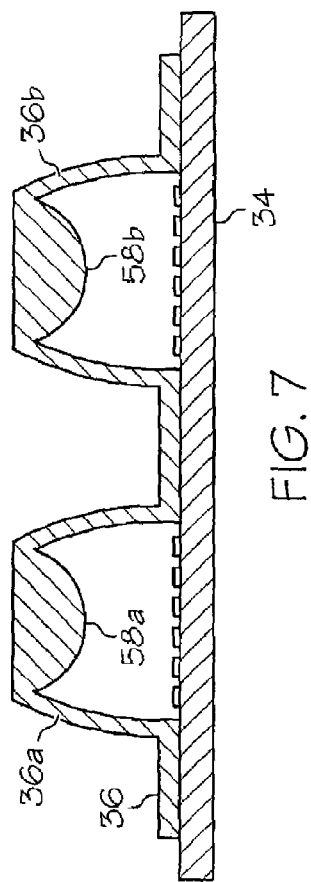

SWITCH-BASED SEAT SENSOR FOR OCCUPANT PRESENCE DETECTION

RELATED PATENT APPLICATION

This patent application claims priority to U.S. Provisional Patent Application No. 60/903,192 filed Feb. 23, 2007.

TECHNICAL FIELD

The present invention is directed to a sensor disposed in a vehicle seat for detecting the presence of a seat occupant.

BACKGROUND OF THE INVENTION

Motor vehicles are customarily equipped with seat occupant detection sensors for use in connection with occupant safety systems including seat belts and pyrotechnically deployed restraints such as air bags. For example, an occupant detection sensor can be used in connection with a seat belt switch to detect an unrestrained seat occupant and trigger an appropriate reminder. Additionally, occupant detection sensors can be used to enable or disable air bag deployment for a particular seating location in the vehicle, and potentially to classify the occupant by seated weight.

A common approach to seat occupant detection involves installing a pressure-responsive sensor on, in or under the bottom foam cushion of the seat, and comparing the measured pressure to calibrated thresholds to detect the presence of an occupant, and possibly distinguish between different classes of occupants. Various types of pressure-responsive sensors have been used for this purpose, including: resistive mats, fluid-filled bladders, and capacitive load cells.

SUMMARY OF THE INVENTION

The present invention is directed to an improved sensor adapted to be installed between the bottom cushion and frame of a seat, the sensor including first and second rigid force translation plates biased apart by a set of springs, and a switch assembly actuated by closing movement between the force translation plates when occupant seat force is sufficient to overcome the bias force of the springs. The switch assembly includes a circuit board fixed with respect to the first force translation plate, and an elastomeric switch pad provided with one or more switch elements with resiliently displaceable contacts that face conductor segments formed on the circuit board. When there is sufficient occupant seat force, the second force translation plate engages the elastomeric switch pad and displaces the contacts into engagement with the circuit board, electrically bridging the circuit board conductor segments to provide an indication of occupant presence. Preferably, the switch elements of the elastomeric switch pad are domed so that the contacts engage the circuit board when the domes collapse in response to occupant seat force. Optionally, the switch element domes and/or contacts may have different heights relative to the circuit board to discriminate different levels of occupant seat force.

BRIEF DESCRIPTION OF THE DRAWINGS

FIG. 3 is a cross-sectional view of the seat sensor of FIG. 2;

FIG. 7 is a partial cross-sectional view of the seat sensor of FIG. 1, according to a fifth embodiment;

DESCRIPTION OF THE PREFERRED EMBODIMENT

The sensor of the present invention is disclosed herein in the context of a seat sensor for sensing the presence of a seat occupant when sufficient force due to the occupant's seated weight is transmitted to the sensor apparatus. However, it should be understood that the disclosed sensor may be used in other applications, both vehicular and non-vehicular.

Figure 1:
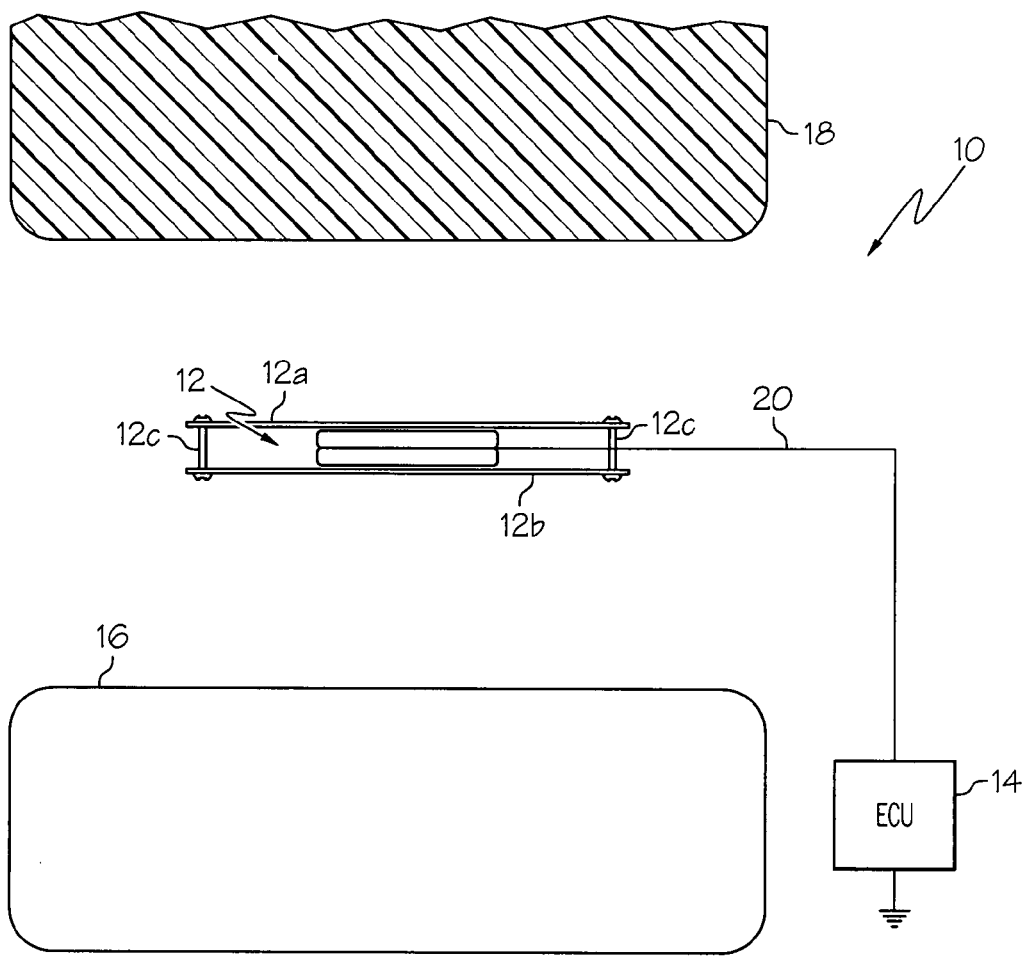
FIG. 1 diagrammatically depicts a vehicle seat equipped with a seat sensor according to the present invention.
Figure 2:
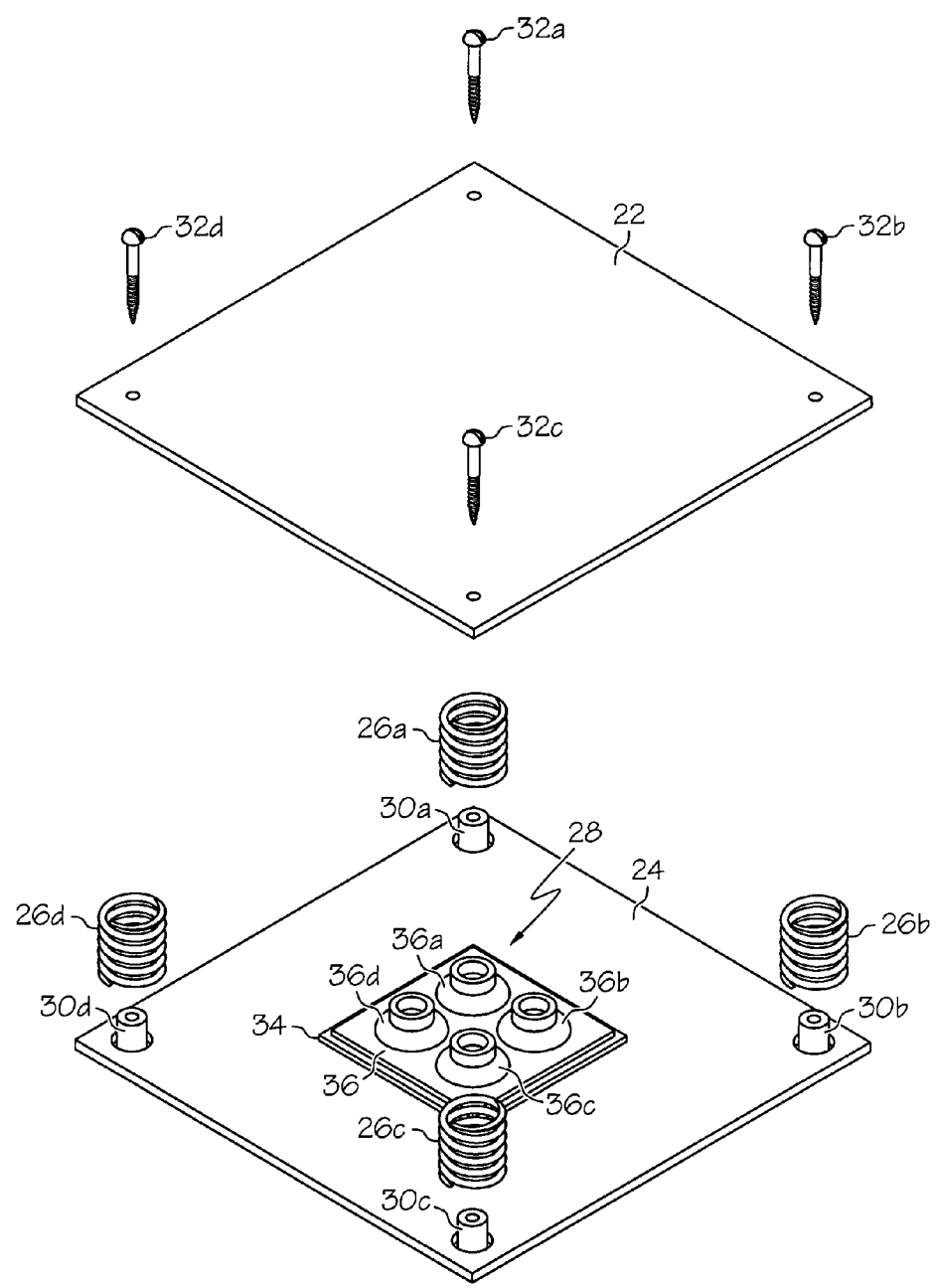
FIG. 2 is an exploded view of the seat sensor of FIG. 1 according to a first embodiment.

Referring to FIG. 1, the reference numeral 10 generally designates a vehicle seat equipped with a seat sensor 12 according to the present invention. In the illustrated embodiment, the seat sensor 12 is disposed between the seat frame 16 and a foam seat cushion 18, though it should be understood that the seat sensor 12 may be installed in a different location such as in the bottom cushion 18, in or behind a back cushion, and so on. In any event, the seat sensor 12 is coupled to an electronic control unit (ECU) 14 by an electrical cable 20. The ECU 14 analyzes the state of sensor 12 to determine whether the seat 10 is occupied, and possibly to distinguish between different classes of occupants based on seated weight and weight distribution. Preferably, ECU 14 forms part of a seat belt reminder system or an airbag deployment system.

As illustrated in FIG. 1, the seat sensor 12 occupies a relatively small percentage of the foam cushion area. While this is perfectly acceptable for sensing the force of a normally seated occupant (i.e., an occupant seated in the center of the cushion 18), it may not be sufficiently responsive to off-center occupant force, such as when an occupant sits on the edge of the seat, or when certain booster seats are placed on the cushion 18. In the embodiment of FIG. 1, the sensor response to such off-center loading is amplified through the addition of upper and lower semi-rigid boards 12a and 12b that are larger in area than the sensor 12. The lower board 12b may be adhered to the lower face of the seat sensor 12 and provided with a felt backing that comes into contact with the seat frame 16. The upper board 12a is fastened to the lower board 12b with push pins 12c or similar fasteners, and is not directly fastened to the seat sensor 12. Alternatively, two or more seat sensors 12 can be affixed to a felt-backed board such as the lower board 12b, in which case the upper board 12a could be omitted. This alternate configuration is not only responsive to off-center occupant force, but can be used to accurately determine the occupant's weight distribution on seat cushion 18, and to reliably distinguish a booster seat from a normally seated occupant of similar apparent weight.

FIGS. 2-7 conceptually depict several different embodiments of the seat sensor 12. Each of these embodiments include an upper force translation plate 22, a lower force translation plate 24, a set of springs 26a, 26b, 26c, 26d, and a switch assembly 28. The force translation plates 22 and 24 are preferably formed of sheet metal (for example, 1.2 mm thick zinc-coated steel), although they may alternatively be formed of molded plastic having similar rigidity. The springs 26a-26d are disposed about a set of center-tapped bushings 30a-30d affixed to the lower force translation plate 24, and the upper force translation plate 22 is attached to the lower translation plate 24 by a set of fasteners 32a-32d that pass through the upper force translation plate 22 and thread into the respective bushings 30a-30d. Joining the upper and lower force translation plates 22 and 24 in this manner establishes a maximum plate separation distance and partially compresses the springs 26a-26d to create a pre-load spring bias force. When occupant weight transmitted through seat cushion 18 exceeds the pre-load bias force created by springs 26a-26d, the upper force translation plate 22 will move downward toward the lower force translation plate 24, further compressing the springs 26a-26d. This downward movement of upper force translation plate 22 is possible because the fasteners 32a-32d are not rigidly fastened to the upper force translation plate 22; the upper force translation plate 22 simply moves axially with respect to the fasteners 32a-32d. Downward movement of the upper force translation plate 22 is limited when it contacts the inboard axial faces of the bushings 30a-30d, thereby establishing a minimum plate separation distance.

The switch assembly 28 is affixed to the lower force translation plate 24 (or alternately, upper force translation plate 22), and includes a circuit board 34 and an elastomeric switch pad 36 defining a set of raised or domed switch elements 36a, 36b, 36c, 36d adapted to be actuated by downward movement of the upper force translation plate 22. While the illustrated switch pad 36 has a set of four switch elements 36a-36d, the number of switch elements is not critical. Preferably, the switch pad 36 is affixed to the circuit board 34, which in turn, is affixed to force translation plate 24. In the embodiments of FIGS. 2-7, the circuit board 34 is affixed to the inboard face of lower force translation plate 24. In the embodiments of FIGS. 10A-10B, 11 and 12, circuit board 34 is affixed to the outboard face of lower force translation plate 24, and all but a marginal portion of the switch pad 36 protrudes through an opening 24a provided in lower force translation plate 24. In either case, downward movement of upper force translation plate 22 due to sufficient occupant weight applied to seat cushion 18 brings the inboard face of force translation plate 22 into contact with the switch elements 36a-36d of elastomeric switch pad 36, and collapses the switch elements 36a-36d into engagement with circuit board 34. Each switch element 36a, 36b, 36c, 36d has a conductive interior contact 38 that engages the circuit board 34 when the respective switch element 36a, 36b, 36c, 36d collapses; when this happens, the contacts 38 electrically bridge a set of conductor segments 34a, 34b, 34c, 34d formed on the face of circuit board 34 to electrically indicate closure of a respective switch element 36a, 36b, 36c, 36d. In FIG. 3, for example, downward displacement of switch element 36a results in electrical bridging of the circuit board conductor segments 34a and 34b; and downward displacement of switch element 36b results in electrical bridging of the circuit board conductor segments 34c and 34d. Since upper force translation plate 22 is not physically constrained to remain perfectly parallel to lower force translation plate 24, off-center application of occupant weight to seat cushion 18 can cause the upper force translation plate 22 to tilt relative to the lower force translation plate 24; in such a case, it is possible that only some of the switch elements 36a-36d will be actuated by the upper force translation plate 22. This circumstance provides justification for using several switch elements 36a-36d as opposed to a single, centrally disposed switch element, and also for positioning one or more the switch elements 36a-36d laterally away from the center of the upper force translation plate 22 for increased sensitivity to off-center occupant loading. In fact, the pattern of switch element closure can be used to detect side-loading of seat cushion 18, which is indicative of an improperly positioned occupant.

FIGS. 3-7 illustrate several different switch element configurations. The embodiment of FIG. 3 illustrates switch elements 36a-36b featuring hollow or annular switch actuation pads 40a, 40b that are designed to collapse during maximum downward movement of the upper force translation plate 22.

Figure 4:
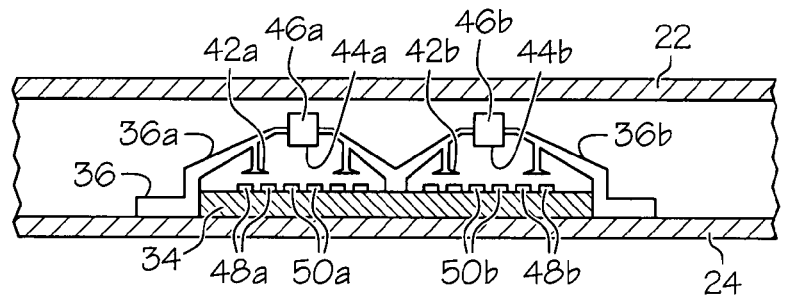
FIG. 4 is a partial cross-sectional view of the seat sensor of FIG. 1, according to a second embodiment.
Figure 5:
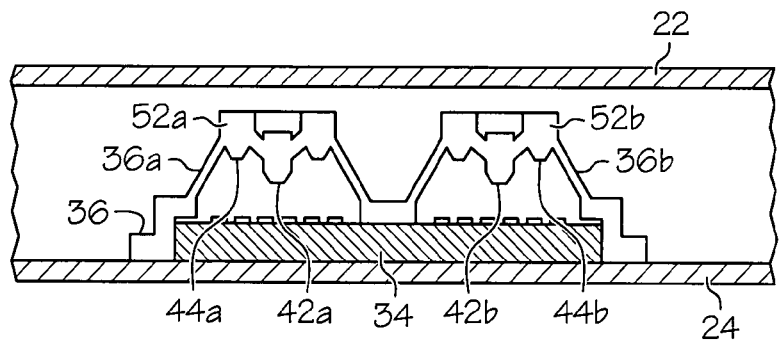
FIG. 5 is a partial cross-sectional view of the seat sensor of FIG. 1, according to a third embodiment.

The embodiments of FIGS. 4-5 illustrate switch elements 36a-36b that feature two sets of contacts 42a, 44a and 42b, 44b that differ in height relative to the circuit board 34 to provide two different levels of actuation for distinguishing between first and second levels of occupant seat force. Referring to FIG. 4, a first level of occupant seat force brings upper force translation plate 22 into engagement with switch actuation pad 46a and/or 46b, and moves the outer circular contacts 42a and/or 42b into engagement with the outer circular conductor segments 48a and/or 48b of circuit board 34; and a second level of occupant seat force produces further downward movement of the switch actuation pad 46a and/or 46b, which additionally brings the center contacts 44a and/or 44b into engagement with the central conductor segments of circuit board 34. Referring to FIG. 5, a first level of occupant seat force brings upper force translation plate 22 into engagement with annular switch actuation pad 52a and/or 52b, and moves the central contacts 42a and/or 42b into engagement with the central conductor segments of circuit board 34; and a second level of occupant seat force produces further downward movement of the switch actuation pads 52a and/or 52b, which additionally brings the outer circular contacts 44a and/or 44b into engagement with the outer circular conductor segments of circuit board 34.

Figure 6:
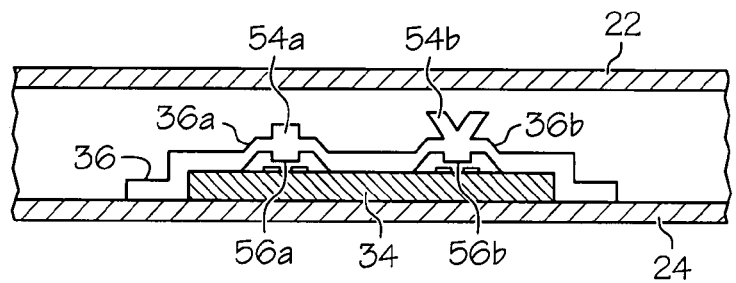
FIG. 6 is a partial cross-sectional view of the seat sensor of FIG. 1, according to a fourth embodiment.

The embodiment of FIG. 6 illustrates switch elements 36a, 36b having switch actuation pads 54a, 54b that differ in height relative to circuit board 34. A first level of occupant seat force brings upper force translation plate 22 into engagement with switch actuation pad 54b, moving the switch contact 56b into engagement with a first pair of conductor segments on circuit board 34; and a second level of occupant seat force additionally brings upper force translation plate 22 into engagement with switch actuation pad 54a, moving the switch contact 54a into engagement with a second pair of conductor segments on circuit board 34.

As indicated above, the dual level sensor embodiments of FIGS. 4-6 can be used to distinguish between two different classes of occupant seated weight. For example, the spring constant of springs 26a-26d and their pre-load force may be calibrated to distinguish between say, a child occupant and an adult occupant. Alternatively, the two levels of force detection can be used to provide a hysteresis function. In this case, the springs 26a-26d and their pre-load force can be calibrated to detect an occupant in response to the second (higher) level of occupant seat force, and the ECU 14 maintains the indicated occupant detection state even if only the first level of occupant seat force is subsequently detected. In other words, the seat status is "occupied" once the second level of occupant seat force is detected, and remains "occupied" so long as at least the first level of occupant seat force is detected. This hysteresis effect compensates for part-to-part variability, as well as variations in sensing characteristics that occur with age, environmental conditions, etc.

Multi-level force sensing can alternatively by achieved by forming contoured switch element contacts that flatten against the circuit board to bridge an increasing number of circuit board conductor segments as the occupant seat force increases. Referring to FIG. 7, this can be achieved, for example, with a spherical or quasi-spherical contact surface 58a, 58b that bridges a force-dependent number of circuit board conductor segments as it is displaced downward due to occupant seat force in excess of the pre-load force. Also, instead of the array of individual circuit board conductor segments, the circuit board 34 can support a conductor pattern that is variably bridged by the switch element contact surfaces 58a, 58b to linearly change the resistance of the conductor pattern.

Figure 8:
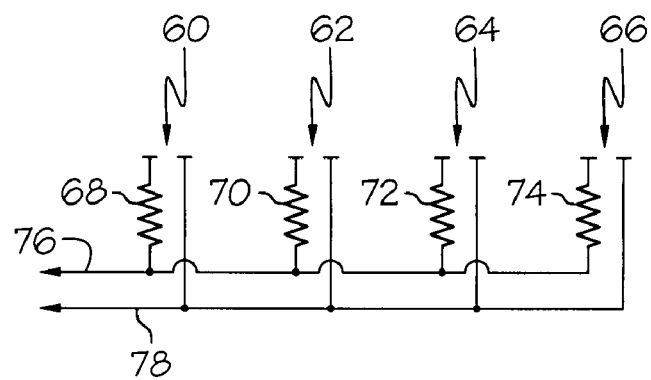
FIG. 8 is a circuit diagram of a resistor matrix for interconnecting multiple switch elements according to this invention.

The cable 20 between seat sensor 12 and ECU 14 allows ECU 14 to determine which of the switch elements of sensor 12 are actuated. This could be achieved, of course, with a set of wires coupling ECU 14 to each conductor segment of circuit board 34. However, a preferred approach is to electrically consolidate the circuit board conductor segments using a resistor matrix as illustrated in FIG. 8 in respect to the four pairs of conductor segments 60, 62, 64, 66. Referring to FIG. 8, a set of equal value resistors 68, 70, 72 and 74 electrically couple one conductor segment of each conductor segment pair 60, 62, 64, 66 to the sensor output line 76; and the other conductor segment of each conductor segment pair 60, 62, 64, 66 is connected to the sensor output line 78. When the most sensitive switch element of sensor 12 is actuated, one resistor is connected between sensor output lines 76 and 78, and as other switch elements are successively actuated, additional resistors are connected in parallel with the one resistor. The ECU 14 detects the resistance between sensor output lines 76 and 78 as an indication of how many switch elements of sensor 12 are actuated.

Figure 9:
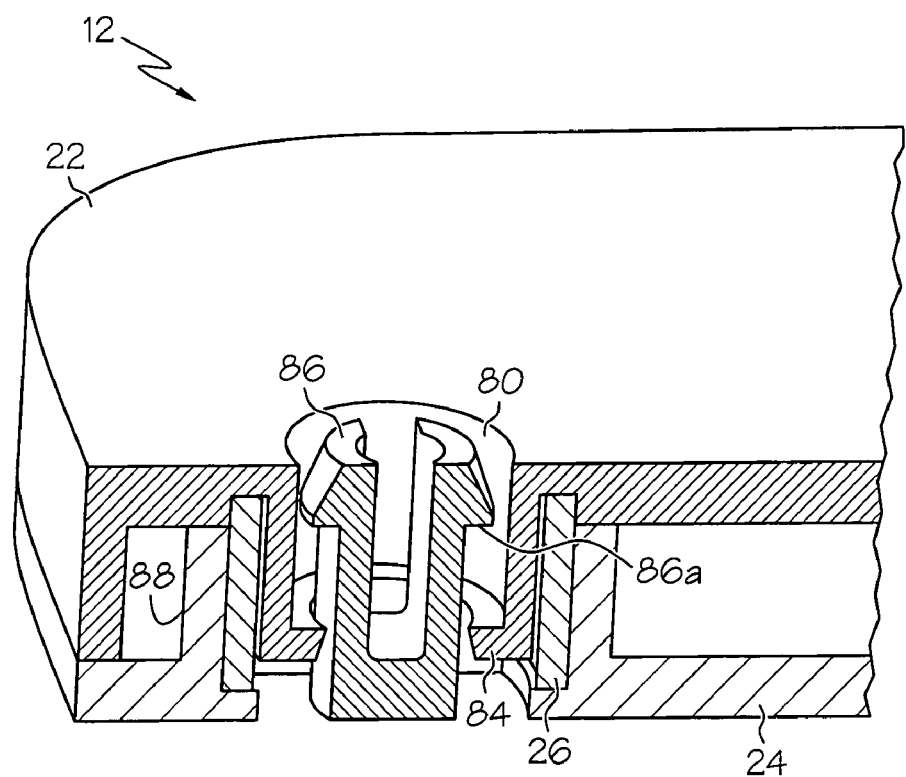
FIG. 9 is a partial cross-sectional view of the seat sensor of FIG. 1, with molded plastic force translation plates.

As indicated above, the force translation plates 22 and 24 can alternatively be formed of molded plastic. In this case, the force translation plates 22 and 24 can be molded with snap features for joining them while permitting the required downward movement of the upper force translation plate 22 relative to the lower force translation plate 24. FIG. 9 illustrates an exemplary embodiment of such a snap feature. The upper force translation plate 22 has a downwardly extending circular well 80 with a restricted opening 84 at the bottom of the well 80. The lower force translation plate 24 has an upwardly extending snap post 86 surrounded by a circular well 88 that is larger in diameter than well 80. The snap post 86 is forced through the restricted opening 84 of well 80 to join the upper and lower force translation plates 22 and 24, and the spring 26 is captured between the circular wells 80 and 88. The sensor 12 is illustrated in a condition of minimum plate separation, defined by interference between the interior and exterior walls of the force translation plates 22 and 24. The maximum plate separation distance, and therefore the pre-load force of spring 26, is determined by the interference between the barb 86a of snap post 86 and the bottom of the circular well 80.

Figure 10A:
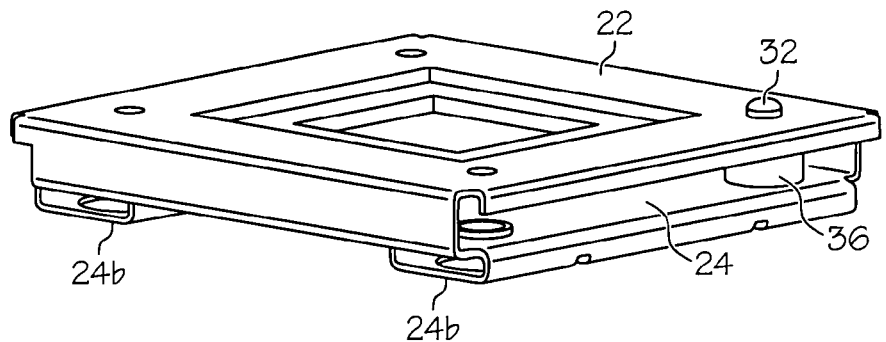
FIG. 10A is an isometric side and top view of a possible production version of the seat sensor of FIG. 1.
Figure 10B:
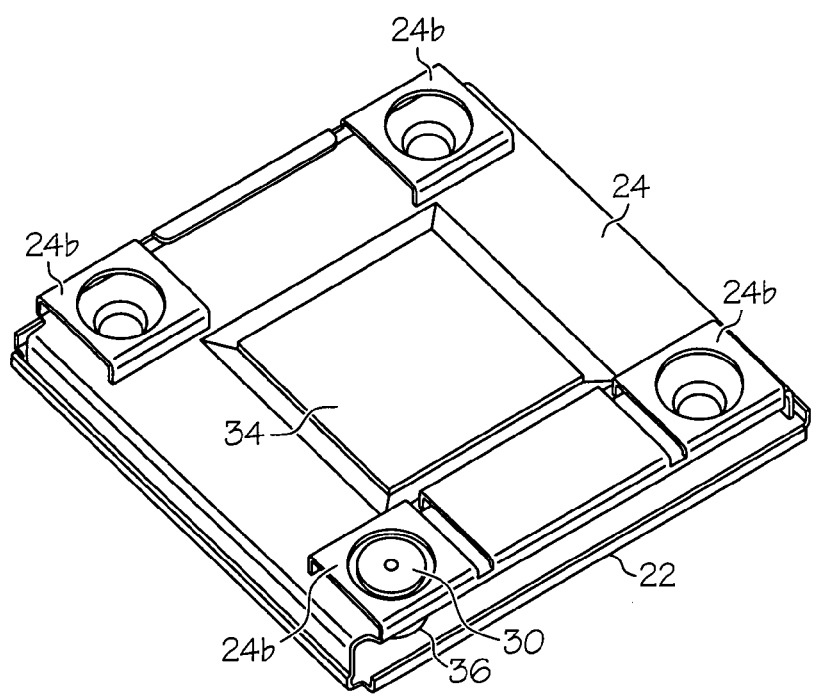
FIG. 10B is an isometric side and bottom view of the seat sensor of FIG. 10A.
Figure 11:
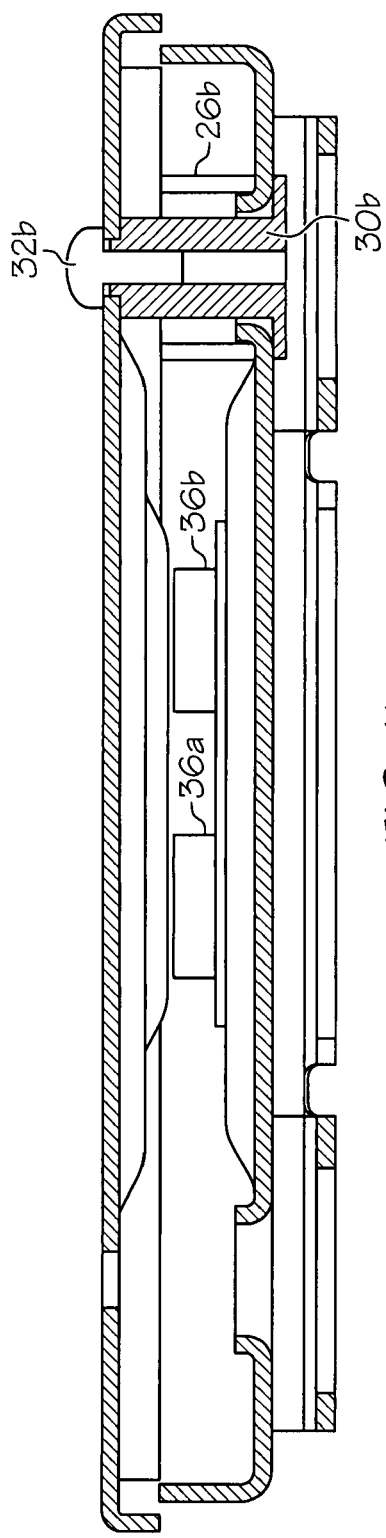
FIG. 11 is a first cross-sectional view of the seat sensor of FIGS. 10A-10B.
Figure 12:
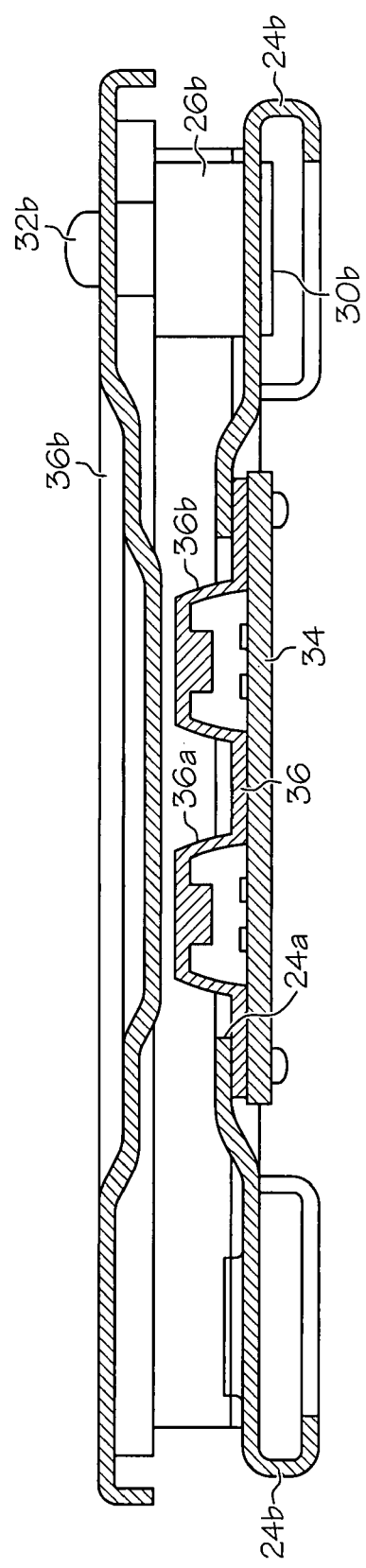
FIG. 12 is a second cross-sectional view of the seat sensor of FIGS. 10A-10B.

FIGS. 10A-10B and 11-12 illustrate a possible production version of the seat sensor 12 with sheet metal force translation plates 22 and 24. While the version of FIGS. 10A-10B and 11-12 is essentially the same as the above-described conceptualized versions, there are several noteworthy differences. First, the edges of the force translation plates 22 and 24 are turned inward in overlapping manner as best seen in FIG. 12 to limit the downward movement of upper force translation plate 22 relative to lower force translation plate 24. Second, the fasteners 32 are fixed with respect to upper force translation plate 22 while the center-tapped bushings 30 are allowed to move axially with respect to the lower force translation plate 24. As a result, the bushings 30 move downward with the upper force translation plate 22 in response to occupant force that exceeds the pre-load force of springs 26. On a related note, the bottom of lower force translation plate 24 is provided with a set of pockets 24b that accommodate the downward movement of bushings 30, as best seen in FIGS. 10B and 11. Third, the lower force translation plate 24 is provided with a central opening 24a, and the circuit board 34 is affixed to the bottom face of lower force translation plate 24, with all but a marginal portion of switch pad 36 protruding through opening 24a. In this way, the electrical connections to the circuit board are on the exterior of the seat sensor 12, and the marginal portion of switch pad 36 seals against the lower force translation plate 24.

In summary, the present invention provides a practical and cost-effective sensor apparatus for passenger presence detection. While the apparatus has been described in reference to the illustrated embodiment, it should be understood that various modifications in addition to those mentioned above will occur to persons skilled in the art. For example, the sensor 12 can be lodged in a pocket formed in the inboard face of seat foam 18, or even over-molded within the seat foam. Accordingly, it is intended that the invention not be limited to the disclosed embodiment, but that it have the full scope permitted by the language of the following claims.

The invention claimed is:

1. Sensor apparatus for detecting the presence of an occupant on a seat, comprising:
   first and second rigid and generally parallel force translation plates disposed in said seat;
   biasing means disposed between said first and second force translation plates for exerting a bias force that biases said first and second force translation plates apart;
   joining means for joining said force translation plates in a manner that pre-loads said biasing means and yet permits closing movement between said first and second force translation plates in response to occupant seat force that exceeds a pre-load force of said biasing means; and
   a switch assembly actuated by a prescribed closing movement between said first and second force translation plates for electrically detecting the presence of said occupant, said switch assembly including a domed elastomeric switch pad mounted on a circuit board, the switch pad defining at least first and second contacts that sequentially bridge first and second sets of conductor segments formed on a face of said circuit board when said switch pad is deflected toward said circuit board by sufficient closing movement between said first and second force translation plates.

2. The sensor apparatus of claim 1, where:
   a first level of occupant seat force is detected when the first contact bridges the first set of conductor segments; and
   a second level of occupant seat force is detected when the second contact bridges the second set of conductor segments.

3. The sensor apparatus of claim 2, where:
   the presence of said occupant is initially detected when said second level of seat force is detected, and the occupant presence detection is maintained so long as the first level of seat force is detected.

4. The sensor apparatus of claim 1 where:
   said domed elastomeric switch pad defines at least first and second domed switch elements carrying said first and second contacts, respectively, such that sufficient closing movement between said first and second force translation plates sequentially deflects the first and second domed switch elements toward said circuit board, causing the first and second contacts to sequentially bridge the first and second sets of conductor segments.

5. The sensor apparatus of claim 4, where:
said first and second domed switch elements have different heights with respect to said circuit board.

6. The sensor apparatus of claim 1, where:
said circuit board includes a resistor network coupling said sets of conductor segments to two wire electrical interface.

7. Sensor apparatus for detecting the presence of an occupant on a seat, comprising:
first and second rigid and generally parallel force translation plates disposed in said seat;
biasing means disposed between said first and second force translation plates for exerting a bias force that biases said first and second force translation plates apart;
joining means for joining said force translation plates in a manner that pre-loads said biasing means and yet permits closing movement between said first and second force translation plates in response to occupant seat force that exceeds a pre-load force of said biasing means; and
a switch assembly actuated by a prescribed closing movement between said first and second force translation plates for electrically detecting the presence of said occupant, said switch assembly including a domed elastomeric switch pad mounted on a circuit board, the switch pad defining at least one contoured contact that is deflected into engagement with said circuit board by the closing movement between said first and second force translation plates and flattens against the circuit board with sufficient occupant set force to bridge an increasing number of circuit board conductor segments as the occupant seat force increases.

8. Sensor apparatus for detecting the presence of an occupant on a seat, comprising:
first and second rigid and generally parallel force translation plates disposed in said seat, said first force translation plate having a central opening;
biasing means disposed between said first and second force translation plates for exerting a bias force that biases said first and second force translation plates apart;
joining means for joining said force translation plates in a manner that pre-loads said biasing means and yet permits closing movement between said first and second force translation plates in response to occupant seat force that exceeds a pre-load force of said biasing means; and
a switch assembly actuated by a prescribed closing movement between said first and second force translation plates for electrically detecting the presence of said occupant, said switch assembly including a domed elastomeric switch pad mounted on a circuit board, said switch assembly being affixed to an outboard face of said first force translation plate such that a marginal portion of said elastomeric switch pad is sandwiched between said circuit board and said first force translation plate, and a domed portion of said elastomeric switch pad extends through the central opening of said first force translation plate.

* * * * *